(12) United States Patent
Escher et al.

(10) Patent No.: US 10,508,347 B2
(45) Date of Patent: Dec. 17, 2019

(54) SCALABLE CHEMICAL REACTOR AND METHOD OF OPERATION THEREOF

(71) Applicant: International Business Machines Corporation, Armonk, NY (US)

(72) Inventors: Werner Escher, Düsseldorf (DE); Patrick Ruch, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/036,293

(22) Filed: Jul. 16, 2018

(65) Prior Publication Data

US 2018/0320280 A1 Nov. 8, 2018

Related U.S. Application Data

(63) Continuation of application No. 14/431,977, filed as application No. PCT/IB2013/058095 on Aug. 29, 2013, now Pat. No. 10,066,306.

(30) Foreign Application Priority Data

Sep. 28, 2012 (GB) .................................. 1217327.4

(51) Int. Cl.
*C25B 15/08* (2006.01)
*H01M 14/00* (2006.01)
(Continued)

(52) U.S. Cl.
CPC ........... *C25B 15/08* (2013.01); *B01J 19/0093* (2013.01); *C25B 1/003* (2013.01); *C25B 9/18* (2013.01);
(Continued)

(58) Field of Classification Search
CPC ........... C25B 1/003; C25B 9/18; C25B 15/08; H01M 14/005; B01J 19/0093;
(Continued)

(56) References Cited

U.S. PATENT DOCUMENTS

| 5,811,062 A | 9/1998 | Wegeng et al. |
| 7,435,503 B2 | 10/2008 | Cohen et al. |

(Continued)

FOREIGN PATENT DOCUMENTS

| CA | 2354513 C | 3/2007 |
| CN | 101809204 A | 8/2010 |

(Continued)

OTHER PUBLICATIONS

Moore et al., "A plate-frame flow-through microfluidic fuel cell stack" Journal of Power Sources 196 (2011), 9481-9487; available online Jul. 31, 2011.

(Continued)

*Primary Examiner* — Ciel P Thomas
(74) *Attorney, Agent, or Firm* — Scully, Scott, Murphy & Presser, P.C.; Grant Johnson, Esq.

(57) ABSTRACT

A photovoltaic apparatus comprising: at least one photovoltaic surface electrically connected to a set of photovoltaic electrodes; and a chemical reactor electrically connected to the set of photovoltaic electrodes. The chemical reactor enables N pairwise fluid contacts among k chemical fluids, with $k \geq 2$ and $N \geq 4$ and comprises: a reaction layer extending in a plane subtended by two directions; N chemical cells, each including two circuit portions, designed for enabling circulation of two of the k chemical fluids, respectively, the two circuit portions intersecting each other, thereby enabling one pairwise fluid contact for the two of the k chemical fluids; and a fluid distribution circuit comprising: k sets of inlet orifices sequentially alternating along lines parallel to one of the two directions; and k sets of outlet orifices sequentially alternating along lines parallel to the inlet orifices, and wherein, each circuit portion connects an inlet orifice to an outlet orifice.

16 Claims, 11 Drawing Sheets

(51) Int. Cl.
*B01J 19/00* (2006.01)
*C25B 1/00* (2006.01)
*C25B 9/18* (2006.01)

(52) U.S. Cl.
CPC .... *H01M 14/005* (2013.01); *B01J 2219/0093* (2013.01); *B01J 2219/00783* (2013.01); *B01J 2219/00813* (2013.01); *B01J 2219/00815* (2013.01); *B01J 2219/00822* (2013.01); *B01J 2219/00824* (2013.01); *B01J 2219/00828* (2013.01); *B01J 2219/00833* (2013.01); *B01J 2219/00853* (2013.01); *B01J 2219/00867* (2013.01); *B01J 2219/00869* (2013.01); *B01J 2219/00894* (2013.01); *B01J 2219/00898* (2013.01); *B01J 2219/00943* (2013.01)

(58) Field of Classification Search
CPC .... B01J 2219/00783; B01J 2219/00813; B01J 2219/00815; B01J 2219/00822; B01J 2219/00824; B01J 2219/00828; B01J 2219/00833; B01J 2219/00853; B01J 2219/00867; B01J 2219/00869; B01J 2219/00898; B01J 2219/0092; B01J 2219/00943
See application file for complete search history.

(56) References Cited

U.S. PATENT DOCUMENTS

| | | | |
|---|---|---|---|
| 7,651,797 B2 | 1/2010 | Markoski et al. | |
| 7,758,814 B2 | 7/2010 | Pinkas et al. | |
| 7,909,971 B2 | 3/2011 | Nusso et al. | |
| 2002/0189950 A1 | 12/2002 | Genders et al. | |
| 2005/0233198 A1 | 10/2005 | Nuzzo et al. | |
| 2006/0160206 A1 | 7/2006 | Holmquist et al. | |
| 2008/0248343 A1* | 10/2008 | Markoski et al. | H01M 4/8605 429/434 |
| 2009/0291347 A1 | 11/2009 | Suzuki et al. | |
| 2010/0155258 A1 | 6/2010 | Kirk et al. | |
| 2010/0200396 A1 | 8/2010 | Le Gallo | |
| 2012/0070766 A1 | 3/2012 | Braff | |

FOREIGN PATENT DOCUMENTS

| | | |
|---|---|---|
| JP | 2000506432 A | 5/2000 |
| JP | 2007196165 A | 8/2007 |
| JP | 2009168824 A | 7/2009 |
| WO | WO2008080075 A1 | 7/2008 |
| WO | WO2009040334 A2 | 4/2009 |
| WO | WO2010083219 A1 | 7/2010 |

OTHER PUBLICATIONS

Salloum et al., "A membraneless microfluidic fuel cell stack", Journal of Power Sources 196 (2011), 1229-1234; available online Sep. 21, 2010.
International Search Report, PCT.IB2013/058095.
Examination Report cited Jun. 29, 2015, from the corresponding Great Britain application.
List of IBM Patents or Patent Applications Treated as Related.

* cited by examiner

M2 + M1 + RP

SCALABLE CHEMICAL REACTOR AND METHOD OF OPERATION THEREOF

FIELD OF THE INVENTION

The invention relates in general to the field of (electro) chemical reactors, as well as methods of operation thereof. In particular, it is directed to scalable chemical reactors designed for enabling N pairwise fluid contacts among k chemical fluids, with $k \geq 2$ and $N \geq 4$, with possible applications to photovoltaic apparatuses and microelectronic packaging.

BACKGROUND OF THE INVENTION

Micro-scale reactors are known, which provide high rates of heat and mass transfer. Conventional microfabrication processes are known, whereby cheap mass-production is nowadays available. In addition, well-controlled laminar flows can be achieved, thanks to known techniques.

The demonstration of microfluidic electrochemical energy conversion was first reported in 2002 (see e.g., Ferrigno et al., Journal of the American Chemical Society 124, 12930-1 (2002); Choban et al., Power Sources Proceedings 40, 317-320 (2002)).

Several patents (applications) have been filed in this field or in neighboring fields which illustrate the background art, for instance: U.S. Pat. No. 7,758,814 B2; US 2012 0070766 A1; U.S. Pat. Nos. 7,651,797 B2; 7,435,503 B2; WO 2010 083219 A1; CA 2354513 C; US 2009/0291347 A1 and U.S. Pat. No. 7,909,971 B2. The list is not exhaustive. Some papers are available in the non-Patent Literature (not mentioned).

BRIEF SUMMARY OF THE INVENTION

According to a first aspect, the present invention is embodied as a chemical reactor, designed for enabling N pairwise fluid contacts among k chemical fluids, with $k \geq 2$ and $N \geq 4$, the reactor comprising:
- a reaction layer essentially extending in a 2D plane subtended by two directions, preferably perpendicular, the reaction layer comprising N chemical cells, each including two circuit portions, the two circuit portions designed for enabling circulation of two of the k chemical fluids, respectively, said two circuit portions further intersecting each other, thereby enabling one pairwise fluid contact for said two of the k chemical fluids;
- a fluid distribution circuit comprising:
  k sets of inlet orifices sequentially alternating along lines parallel to one of the two directions, for respectively dispensing k chemical fluids to the reaction layer; and
  k sets of outlet orifices sequentially alternating along lines parallel to the inlet orifices, for respectively collecting k chemical fluids from the reaction layer, the outlet orifices shifted along said one of the two directions with respect to the inlet orifices, and wherein,
each circuit portion connects, via respective ends thereof, an inlet orifice to an outlet orifice.

In embodiments, the above chemical reactor may further comprise one or more of the following features:
- each of the orifices joins ends of four circuit portions, each of the four circuit portions belonging to distinct chemical cells, said distinct chemical cells contiguous in the reaction plane;
- the reaction layer and the fluid distribution circuit form a 2D periodic array, a unit cell of said array periodically repeating in said 2D plane by translation along one or each of said two directions;
- $k=2$; each of the orifices joins ends of four circuit portions belonging to distinct chemical cells, said distinct chemical cells contiguous in the reaction plane; and each unit cell comprises:
  four chemical cells;
  eight circuit portions;
  two inlet orifices; and
  two outlet orifices;
- the fluid distribution circuit comprises at least a first manifold, the latter comprising several parallel channels, each perpendicular to said one of the two directions and in fluid communication with orifices of one of the k sets of inlet orifices or one of the k sets of outlet orifices;
- the fluid distribution circuit further comprises one or more additional manifolds, an $n^{th}$ additional manifold comprising several parallel channels that are, each, rotated with respect to and in fluid communication with channels of an $(n-1)^{th}$ manifold;
- a manifold is formed by two superimposed layers, a first one of said two superimposed layers comprising orifices as through holes, and a second one of said two superimposed layers comprising channels as through holes;
- the outlet orifices are shifted by less than the distance between two contiguous inlet orifices along said one of the two directions, and preferably are shifted by half of this distance; and
- the reactor is an electrochemical reactor, and two circuit portions that connect, each, a same inlet orifice to a same outlet orifice are separated by a wall coupled in the reactor as an electrode, such that two chemical cells adjacent along said one of the two directions share said electrode.

According to another aspect, the invention is embodied as a photovoltaic apparatus, such as: a photovoltaic cell; a photovoltaic module; or a photovoltaic system comprising an array of photovoltaic cells or an array of photovoltaic modules; the photovoltaic apparatus comprising:
- at least one photovoltaic surface electrically connected to a set of photovoltaic electrodes; and
- a chemical reactor according to any one of the above embodiments, electrically connected to the set of photovoltaic electrodes.

According to still another aspect, the invention is embodied as a method of operating a device according to any one of the previous embodiments, the method comprising: enabling N pairwise fluid contacts by
- dispensing k chemical fluids to the reaction layer, with $k \geq 2$, via the k sets of inlet orifices, such that, in each of the N chemical cells, two of the k chemical fluids circulate in two respective circuit portions, make contact and thereby enable a chemical reaction; and
- collecting k chemical fluids from the reaction layer via the k sets of outlet orifices.

Preferably, the reactor is an electrochemical reactor such as defined above, and the method further comprises: dispensing or collecting electrical charges to or from electrodes, respectively, wherein each of said electrodes separates two circuit portions that connect, each, a same inlet orifice to a same outlet orifice, whereby each of said electrodes is shared by two chemical cells adjacent along said one of the two directions.

Devices, apparatuses and methods embodying the present invention will now be described, by way of non-limiting examples, and in reference to the accompanying drawings.

DETAILED DESCRIPTION OF THE INVENTION

The following description is structured as follows. First, general embodiments and high-level variants are described (sect. 1). The next section addresses more specific embodiments and technical implementation details (sect. 2).

1. General Embodiments and High-level Variants

Referring generally to FIGS. 1 to 10, an aspect of the invention is first described, which concerns a chemical reactor. This reactor CR is designed for enabling N pairwise fluid contacts among k chemical fluids. For simplicity, the geometrical concept underlying the invention is illustrated in the appended drawings for k=2 fluids. However, the most general concept is valid for k≥2, as shall be apparent from the following description.

The reactor principally comprises a reaction layer RP and a fluid distribution circuit M1, M2, which are described now.

Figure 2:
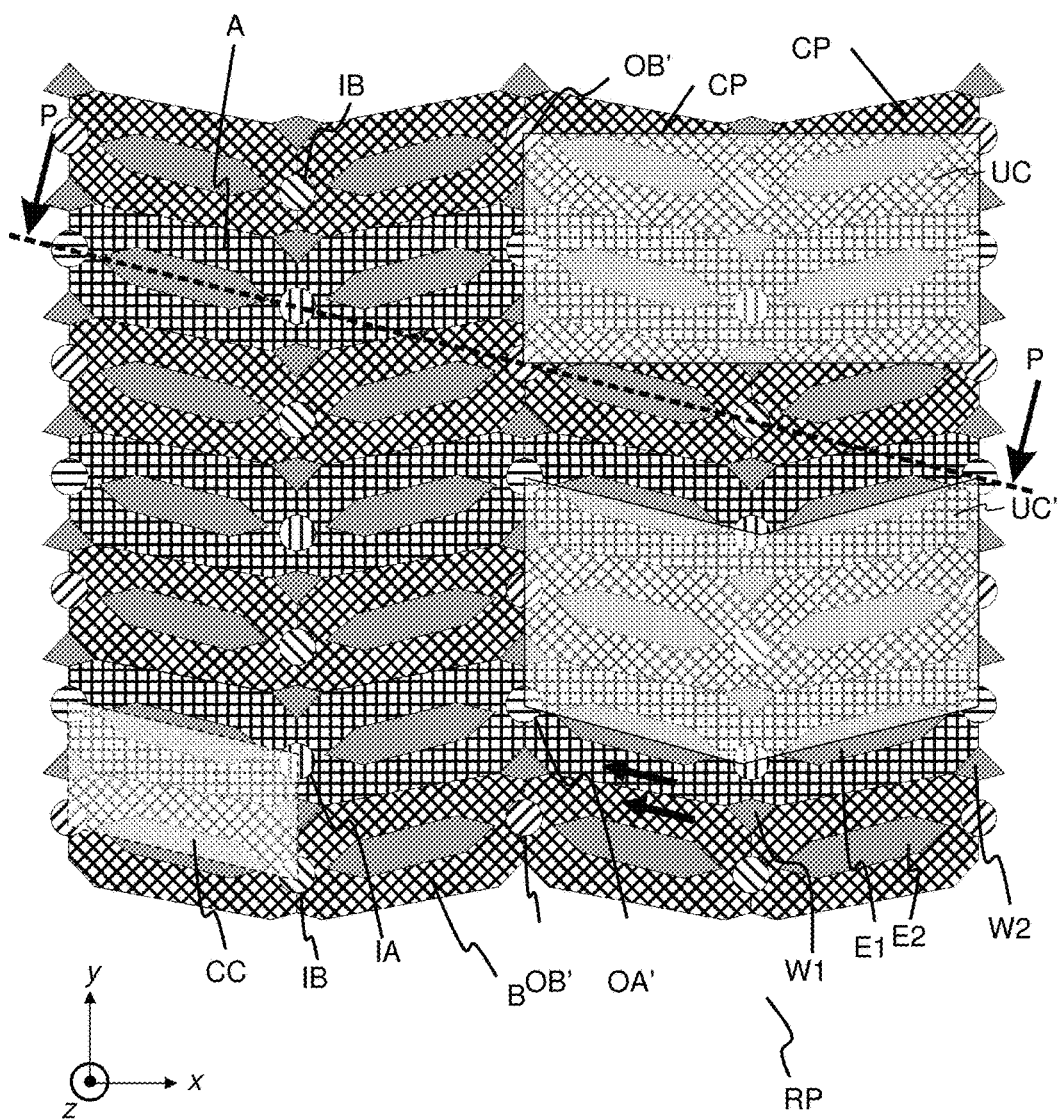
FIG. 2 is a 2D view of a simplified representation of a reaction layer of a chemical reactor, according to embodiments, where the reaction layer comprises several chemical cells as depicted in FIG. 1.

First, as illustrated in FIG. 2, the reaction layer RP essentially extends in a 2D plane (i.e., subtended by two directions x, y, typically perpendicular, as seen in FIG. 2). This reaction layer comprises several chemical cells CC. The reaction layer RP may also be referred to as a "conversion plane", a "conversion layer", etc.

Figure 1:
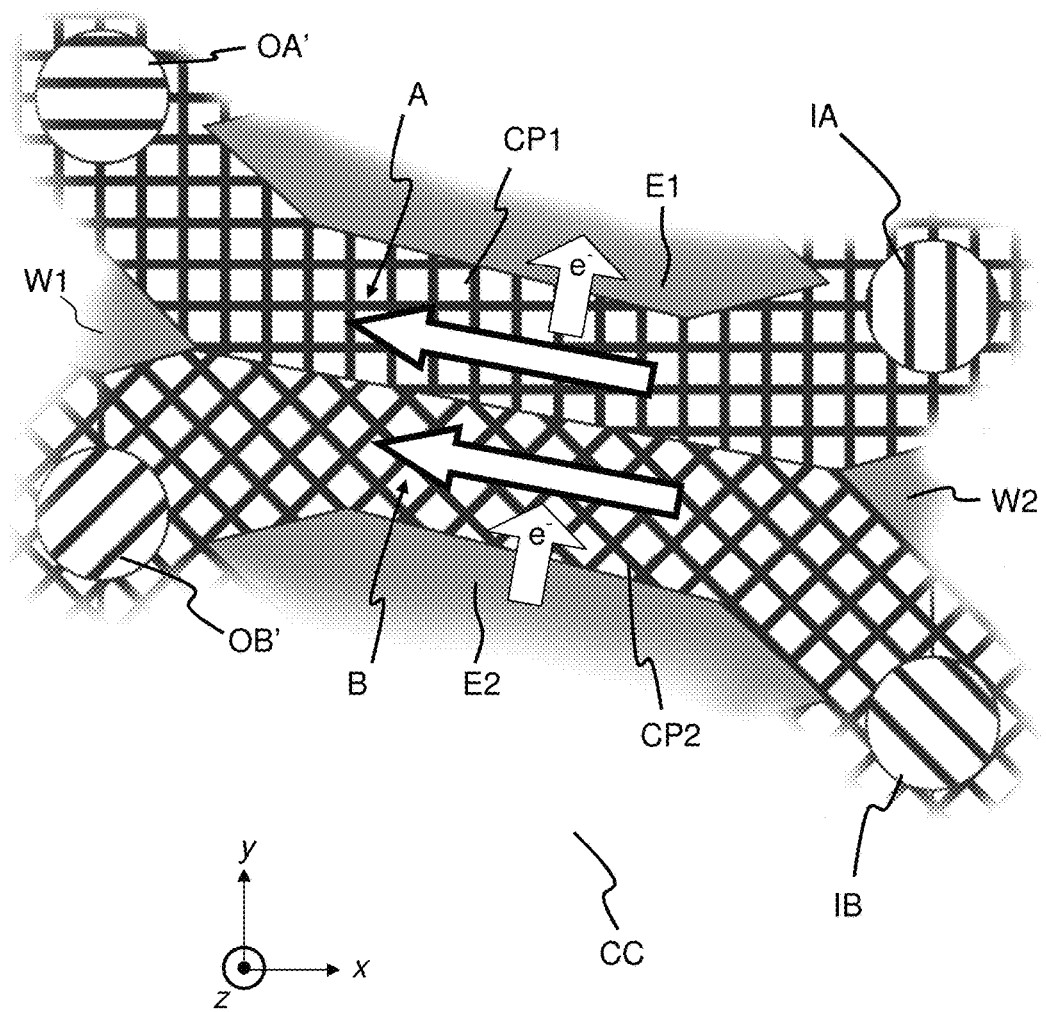
FIG. 1 is a 2D view of a simplified representation of an example of chemical cell as used in a chemical reactor according to embodiments.

An example of chemical cell is depicted in FIG. 1. This cell includes two circuit portions CP1, CP2 (circuit portions are generally denoted by reference CP). These circuit portions are each designed for circulating a chemical fluid A, B, such that the two portions of one chemical cell enable circulation of two of the k chemical fluids, respectively (i.e., each of the two portions enables circulation of one of the k chemical fluids). As further seen in FIG. 1, the circuit portions CP1, CP2 intersect each other, which results in one pairwise fluid contact (for two fluids A, B). The circuit portions typically intersect each other over a relatively large overlap area. To that aim, they may have a broken shape or be curved (or have any other suitable shape), as illustrated in FIG. 1.

Second, the fluid distribution circuit principally comprises sets of inlet orifices and outlet orifices, these orifices being visible in each of FIGS. 1-4 and 8-9.

More precisely, the fluid distribution circuit comprises k sets of inlet orifices (k≥2), i.e., there are as many sets as fluids. As seen in FIG. 2 (where k=2), the orifices IA, IB sequentially alternates along lines parallel to direction y. More in detail, inlet orifices IA, IB are arranged in lines parallel to direction y and in each of these lines, the inlet orifices sequentially alternate to form sequences such as IB-IA-IB- . . . . The inlet orifices allow for dispensing each of the chemical fluids (e.g., the two chemical fluids A, B) to the reaction layer RP. More generally, k sets of inlet orifices allow for respectively dispensing the k chemical fluids.

Similarly, the fluid distribution circuit further comprises k sets of outlet orifices OA', OB', the outlet orifices sequentially alternating along lines parallel (strictly) to the inlet orifices (and thus parallel to the same direction y as well). This results in sequences OB'-OA'-OB'- . . . parallel the sequences IB-IA-IB- . . . along vertical direction y. The outlet orifices are meant to respectively collect k chemical fluids from the reaction layer. As illustrated in FIG. 1 (or 2), each circuit portion CP1, CP2 connects, via respective ends thereof, an inlet orifice (IA or IB) to an outlet orifice (OA' to OB').

For completeness, the outlet orifices must be shifted along direction y (or more generally along the reference direction), with respect to the inlet orifices. Basically, the shift of the outlet orifices vs. the inlet orifices implies a wave pattern of the circuit portions, see FIG. 2. This shift shall allow for providing and collecting fluid (i.e., liquid) to and from the reaction layer RP, by way of parallel channels of alternating type. This, together with the other geometrical constraints captured in the above specifications, allows for the scalability of the fluid distribution process and thus of the chemical reactor itself.

The reactor described above is meant to be filled with k chemical fluids (mostly liquids), in operation. Although pairwise fluid contacts are enabled, the mixing of the fluids can be intentionally avoided (e.g., thanks to co-laminar flows). Well-controlled laminar flow techniques, resulting in diffusional (only) mixing of the liquids can be achieved, thanks to methods known per se, as outlined in the introduction. Thus, it is not mandatory to separate the liquids at the contact point. NB: for those embodiments which involve co-laminar flows, "fluid" means "liquid" in practice as co-laminar flows of gases are not easily achieved in practice.

Figure 11:
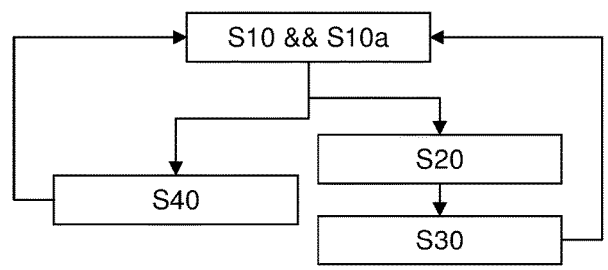
FIG. 11 is a flowchart illustrating steps of a method of operating a device according to embodiments.

In that respect, the present invention can be embodied as a method of operating a device as described herein. Basically, the core of the method consists of enabling N pairwise fluid contacts by dispensing (FIG. 11, step S10) k chemical fluids to the reaction layer, k≥2, via the k sets of inlet orifices, such that, in each of the N chemical cells CC, two of the k chemical fluids circulate (step S20) in two respective circuit portions CP1, CP2, make contact (step S30) and thereby enable the desired chemical reaction. In the meantime (i.e., while the fluids are dispensed and/or after step S10 has begun), the k chemical fluids are collected from the reaction layer via the k sets of outlet orifices, step S10a.

In FIGS. 1-2, distinct square patterns are used for illustrating the paths taken by the two fluids A, B in the circuit portions CP of the chemical cells CC (horizontal-vertical square pattern for fluid A, rotated square pattern for fluid B). Still other patterns are used to distinguish orifices IA, IB, OA', OB', for reasons to be explained later. Note that the nature of the fluids collected from OA' and OB' may slightly differ from the fluids dispensed via IA and IB, because of (partial) diffusion at the contact between circuit portions. For this reason, primes are used to reference the outputs OA' and OB', i.e., to remind that the fluids as collected may slightly differ from the fluids as injected.

As noted earlier, each chemical cell CC enables at least one pairwise contact. Now, the requested alternating sequences of inlet/outlet orifices imply N≥4. Indeed, a limited sequence IB-IA-IB along one line parallel to direction y already imply a first set of two vertically contiguous chemical cells (if k=2); considering now that a parallel (and shifted) sequence OB'-OA'-OB' will also imply a second set of two vertically contiguous chemical cells (also contiguous with the first set of chemical cells), the minimal number of chemical cells (and thus of pairwise contacts) involved is thus N≥4. Generalizing this, N can take any value m+m'−2, with m≥3 and m'≥3, where m and m' are the number of "monomers" (IB, IA, OB' or OA') in each parallel line, such that N can take any value larger than 4 (and not necessary even). Thus, practical realizations may result in N≥1, for any integer value of 1 (≥4). For example, FIG. 2 explicitly shows 24 pairwise contacts. Yet, one understands that N can, in practice, be much larger, e.g., 1024.

Referring more particularly to FIGS. 1, 2: each of the inlet/outlet orifices preferably joins ends of four circuit portions CP, that each belongs to distinct chemical cells CC (but are contiguous in the reaction plane RP). As one understands from FIG. 2, such a configuration allows for markedly increasing the density of circuit portions CP, and in turn of chemical cells CC in the reaction layer RP. More generally though, the chemical reactor needs not be such that each orifice joins ends of four circuit portions. One can also build a chemical reactor with less circuit portions at the expense of lower density. One may for instance have only one inlet orifice and one outlet orifice for each fluid circuit portion. Yet, four times more orifices would be needed, in comparison to the preferred case and the reaction layer RP would not be packed as densely with chemical cells. Having each orifice joining ends of four circuit portions is accordingly the preferred way of embodying a chemical reactor (with two chemical fluids or more).

Referring now more particularly to FIG. 2: the reaction layer RP and the fluid distribution circuit preferably form a 2D periodic array, i.e., a unit cell UC of said array periodically repeats in the 2D plane (by translation along one or each of said two directions x, y). Note that owing to the minimal set of geometrical constraints described above (e.g., the shift of OB'-OA'-OB' vs. IB-IA-IB, a unit cell necessarily comprises subsets of non-parallel channel portions CP. The choice of unit cell is not unique: in FIG. 2, two unit cells UC and UC' are depicted, for illustration. A 2D periodic array is preferred inasmuch as it allows for both increasing the packing density while easing the manufacture process.

Importantly, a unit cell captures features of both the chemical cells CC and the fluid distribution circuit (i.e., orifices). Yet, since a single orifice shall preferably connect several circuit portions of distinct chemical cells CC, the orifices are the limiting factors when determining minimal unit cells. As for instance seen in FIG. 2, the minimal unit cells UC, UC' are primarily determined by a minimal set of orifices needed (i.e., IA, IB, OA', OB').

A preferred embodiment that combines several of the options evoked above (explicitly or not) is for instance one wherein: k=2; each orifice joins the ends of four circuit portions (belonging to distinct chemical cells); and each unit cell comprises:

four chemical cells;
eight circuit portions;
two inlet orifices IA, IB; and
two outlet orifices OA', OB'.

This embodiment precisely corresponds to the appended drawings. However, each unit cell may more generally comprise 2 k chemical cells, where the factor 2 comes from the fact that both input and output are needed, while the factor k is due to the number of fluids. This would mean vertical sequences such as IA-IB-IC-ID . . . , and OA'-OB'-OC'-OD' . . . . Similarly, one would obtain 4 k circuit portions, k inlet orifices and k outlet orifices. Still, each of the orifices joins ends of four circuit portions (each portion belonging to distinct chemical cells).

Having realized how a dense packing of chemical cells can be achieved for enabling pairwise contacts with k fluids, one may advantageously apply the above (general) solution to any value of k>2, k>3 or k>4, etc., a thing that results in very original designs. Such embodiments, however, give rise to complex technical drawings and are therefore not explicitly rendered in the appended drawings. Still, we note that, if one abstracts the stripped or square patterns used to render CP1, CP2, IA, IB, OA', and OB', then the residual template shown in FIG. 2 remains valid for any k (unit cells UC, UC' depends on the value of k as well). It is nevertheless believed that the appended drawings suffice to understand the essential, conceptual aspects and technical contributions of the present invention.

Figure 3:
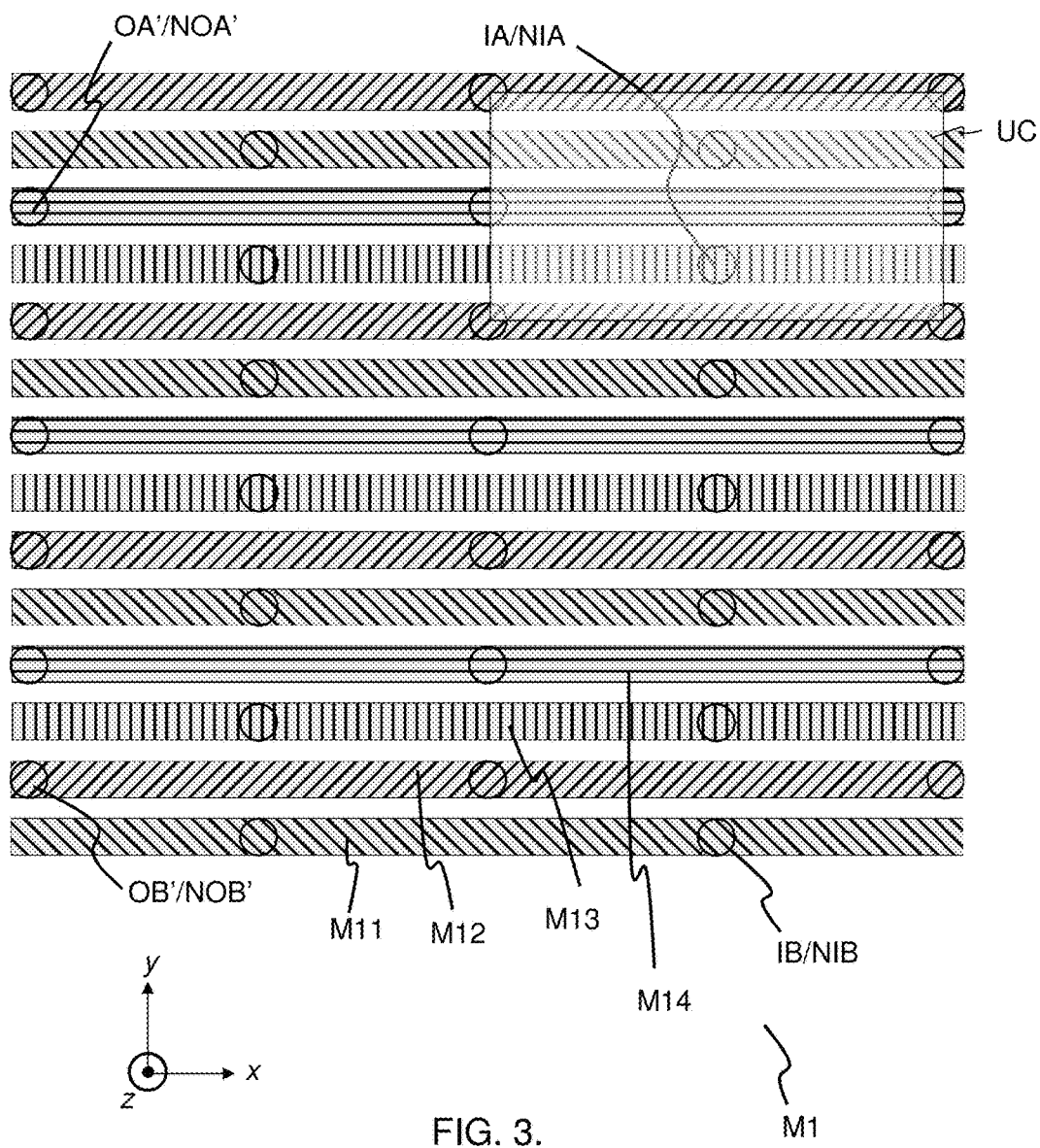
FIG. 3 is a 2D view of a simplified representation of a first manifold of a fluid distribution circuit of a chemical reactor, compatible with the reaction layer of FIG. 2, according to embodiments.
Figure 4:
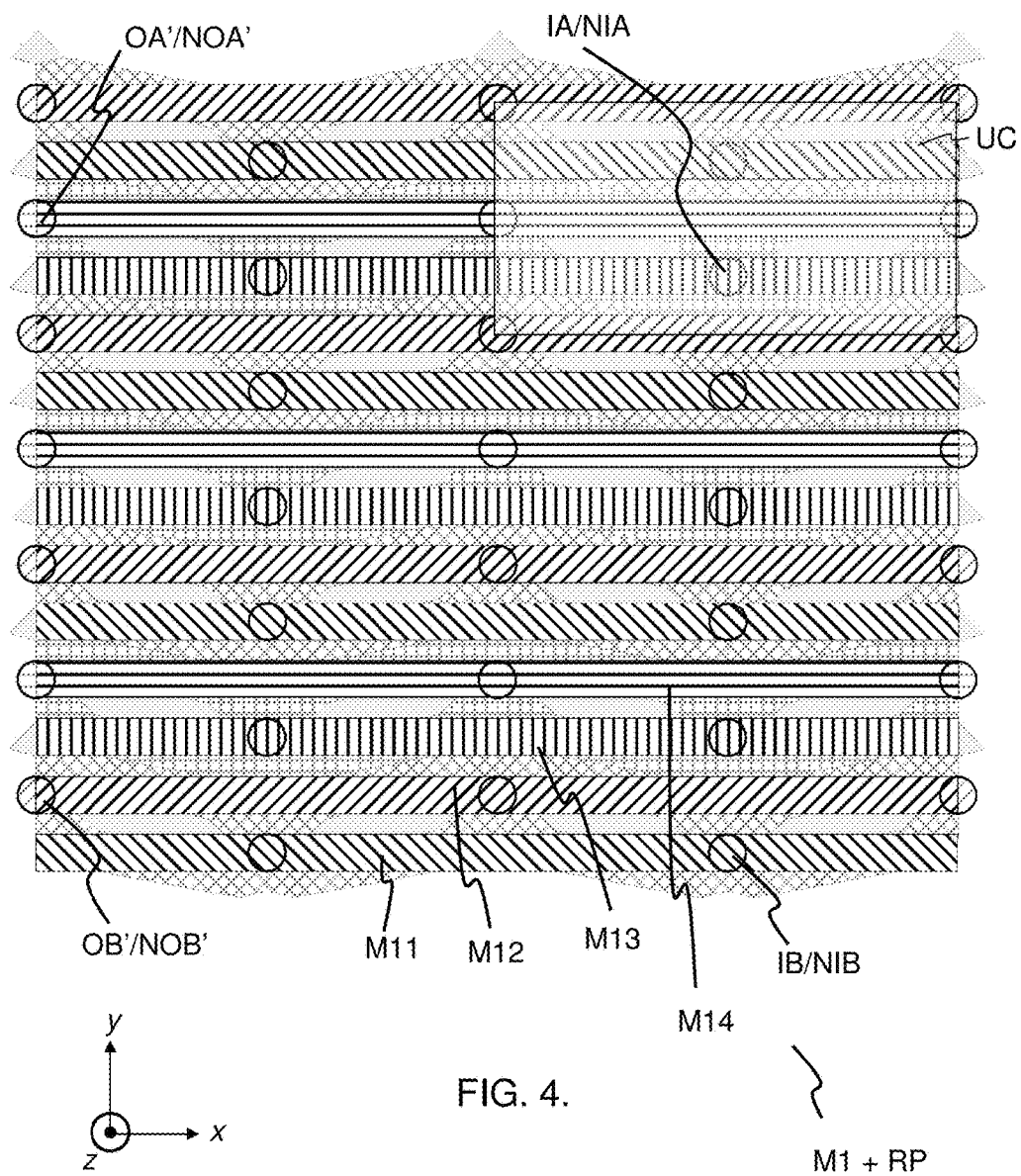
FIG. 4 is a 2D view of the first manifold of FIG. 3, superimposed to the view of the reaction layer of FIG. 2, as in embodiments.

Referring now to FIGS. 3-4: the fluid distribution circuit preferably comprises at least one manifold M1, which itself comprises several parallel channels M11-M14. Each of these parallel channels M11-M14 must then be perpendicular to direction y (or, say, the reference direction), for compatibility reasons. Each of the parallel channels M11-M14 is furthermore in fluid communication with orifices of one of the sets (A or B) of orifices (inlet or outlet). To that aim, orifices or nozzles NIA, NIB, NOA', NOB' can be provided in the manifold M1, respectively coupled to, i.e., vis-à-vis the orifices IA, IB, OA', OB' that directly connect to the circuit portions at the level of the reaction layer RP. Still, the nozzles NIA, NIB, NOA', NOB' and the orifices IA, IB, OA', OB' could be one and a same thing. More generally, each of the parallel channels is in fluid communication with orifices of one of the k sets of inlet orifices or one of the k sets of outlet orifices. This implies that the parallel channels of M1 sequentially alternate as well, to meet the corresponding type of orifices. It follows from the above definitions that there are 2 k types of channels in M1.

Now, since one channel type connects to several orifices of the same type, see FIGS. 3 and 4, the number of channels is much less than the number of orifices. In addition, thanks to the shifted and alternating orifices, the fluid distribution to/collection from orifices can be achieved via sequentially alternating parallel channels, a thing that advantageously allows for scalability of the upstream and downstream distribution circuits with respect to the reaction layer RP (i.e., up- and downstream with respect to the inlet/outlet orifices IA, IB, OA', OB') as well.

As touched above, since two types of fluids (A and B) are assumed in the appended drawings and two types of orifices are needed for input and output, there are 4 types of manifold channels. Each type of channels is depicted using distinct patterns (horizontal, vertical or diagonal stripes "///" or "\\\").

In FIG. 4, the manifold M1 is shown superimposed to the reaction layer of FIG. 2, to allow the reader to see where the manifold connects to the reaction layer RP.

Figure 5:
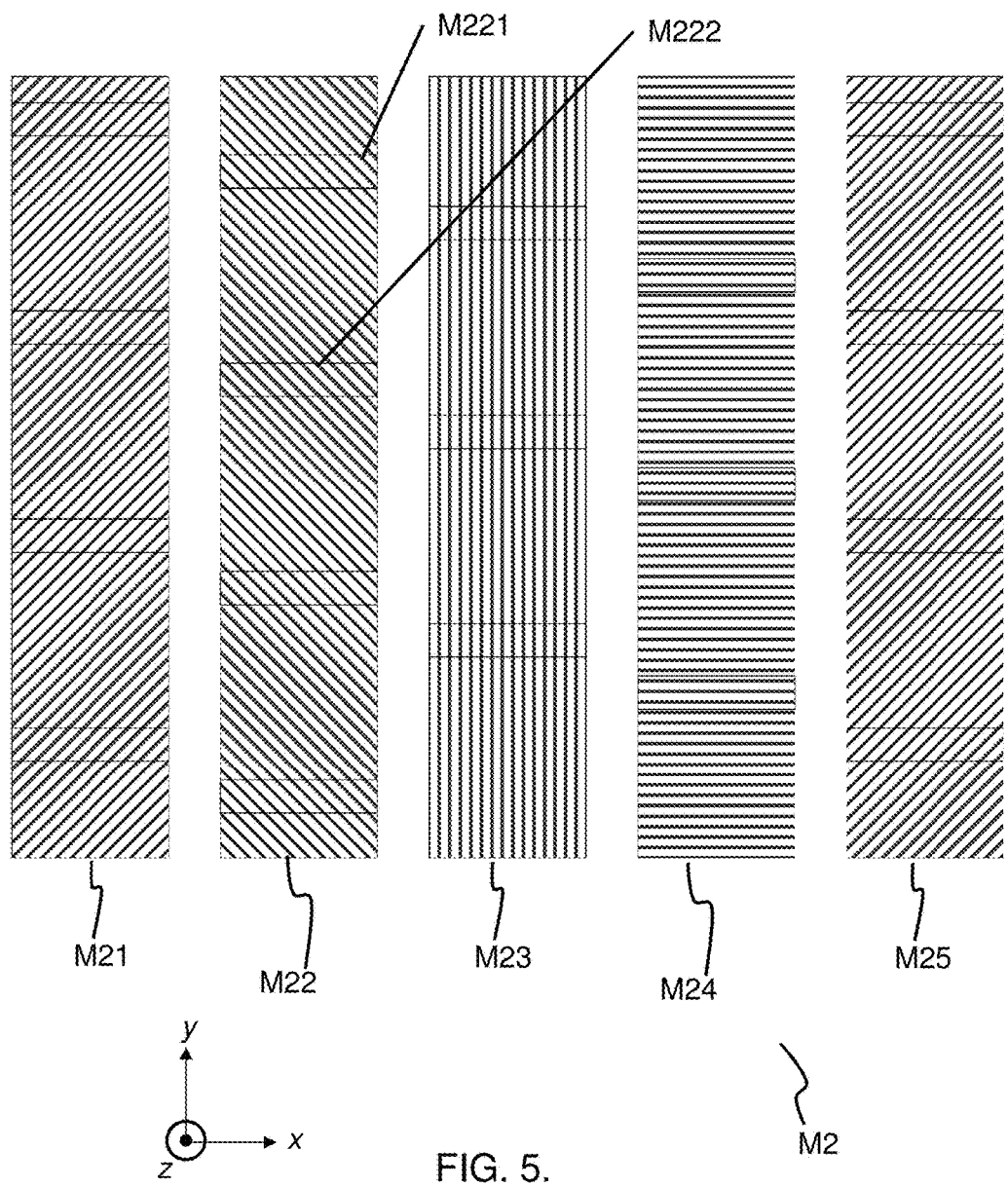
FIG. 5 is a 2D view of a simplified representation of a second manifold of a fluid distribution circuit of a chemical reactor, compatible with the first manifold of FIG. 3 or 4, according to embodiments.
Figure 6:
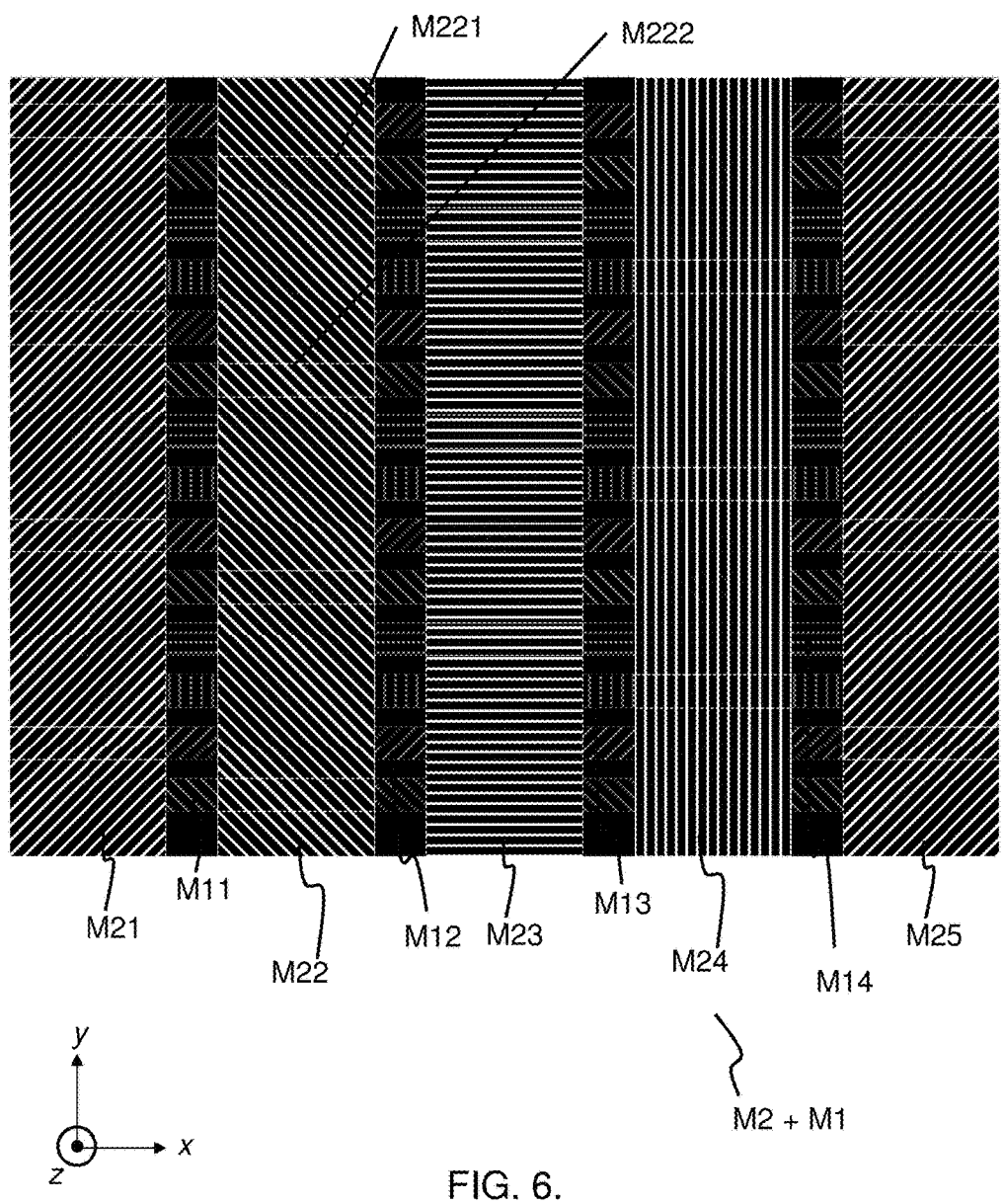
FIG. 6 is a 2D view of the second manifold of FIG. 5, superimposed to the view of FIG. 3.
Figure 7:
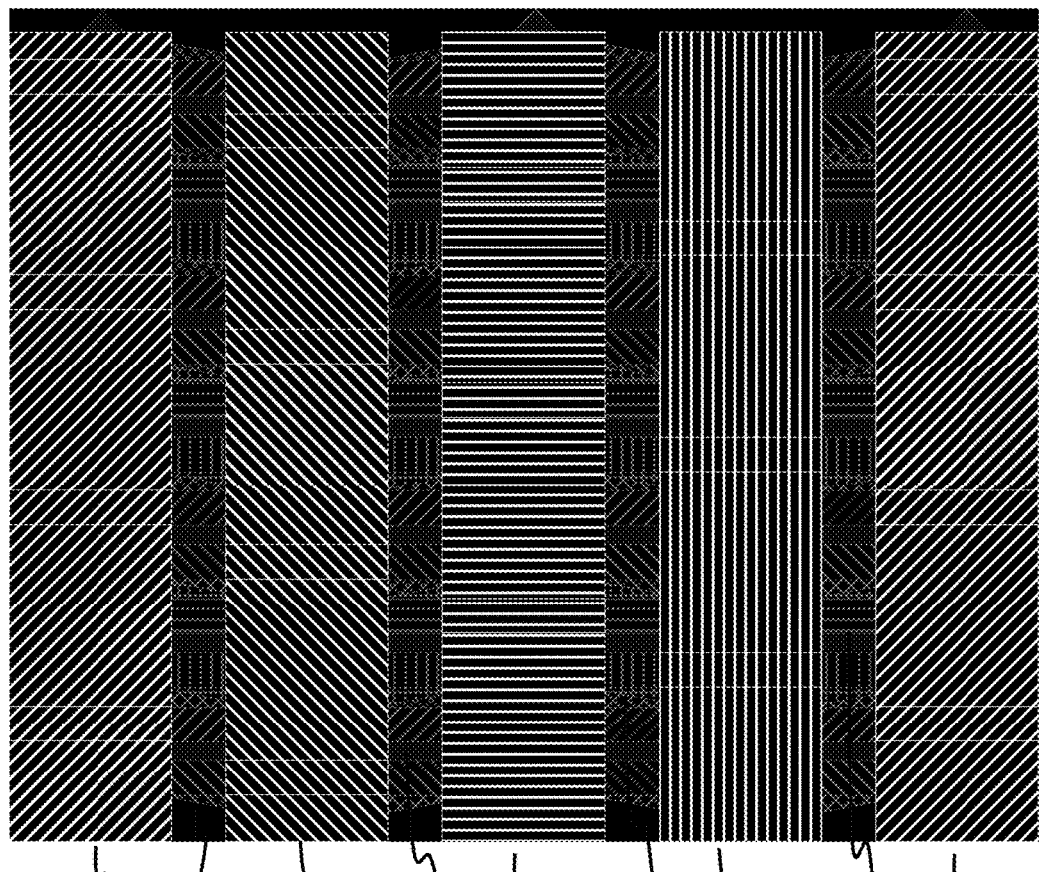
FIG. 7 is a 2D view of the second manifold of FIG. 5, superimposed to the view of FIG. 4, as in embodiments.

Similarly, the fluid distribution circuit may further comprise one or more additional manifolds, as illustrated in FIGS. 5-7 with (only) one additional manifold M2. In that case, the additional manifold M2 comprises several parallel channels M2$i$ (i.e., M21-M25 in the drawings) that are, each, rotated with respect to channels M1$i$ of M1 (e.g., perpendicular thereto), and in fluid communication with channels M1$i$ of M1. For instance, nozzles M2$ij$ (i.e., M221 and M222 in the drawings) may be provided in the channels M2$i$ to enable fluid communication with M1. The same principle can be generalized to an n$^{th}$ additional manifold, in fluid communication with an (n−1)$^{th}$ manifold (e.g., M3 of FIG. 8). Thus, one understands that there is 2 k types of channels in each of the manifolds M1, M2, etc. However, since one channel type in Mn (e.g., M4 of FIG. 8) connects to several channels in Mn−1, see FIGS. 5 and 6, the number of channels in Mn is much less that the number of channels in Mn−1. The sequence of manifolds as defined above allows for enabling a fluid communication between, on the one hand, macroscopic fluid inlet/outlet e.g., by way of tubing ports, and on the other hand, microscopic or at least much smaller orifices at the level of the reaction layer RP. The underlying principle is, once more, fully scalable. More generally, manifold layers may be added if and as necessary to facilitate the supply of the k fluids to the reactor from an external source.

Figure 8:
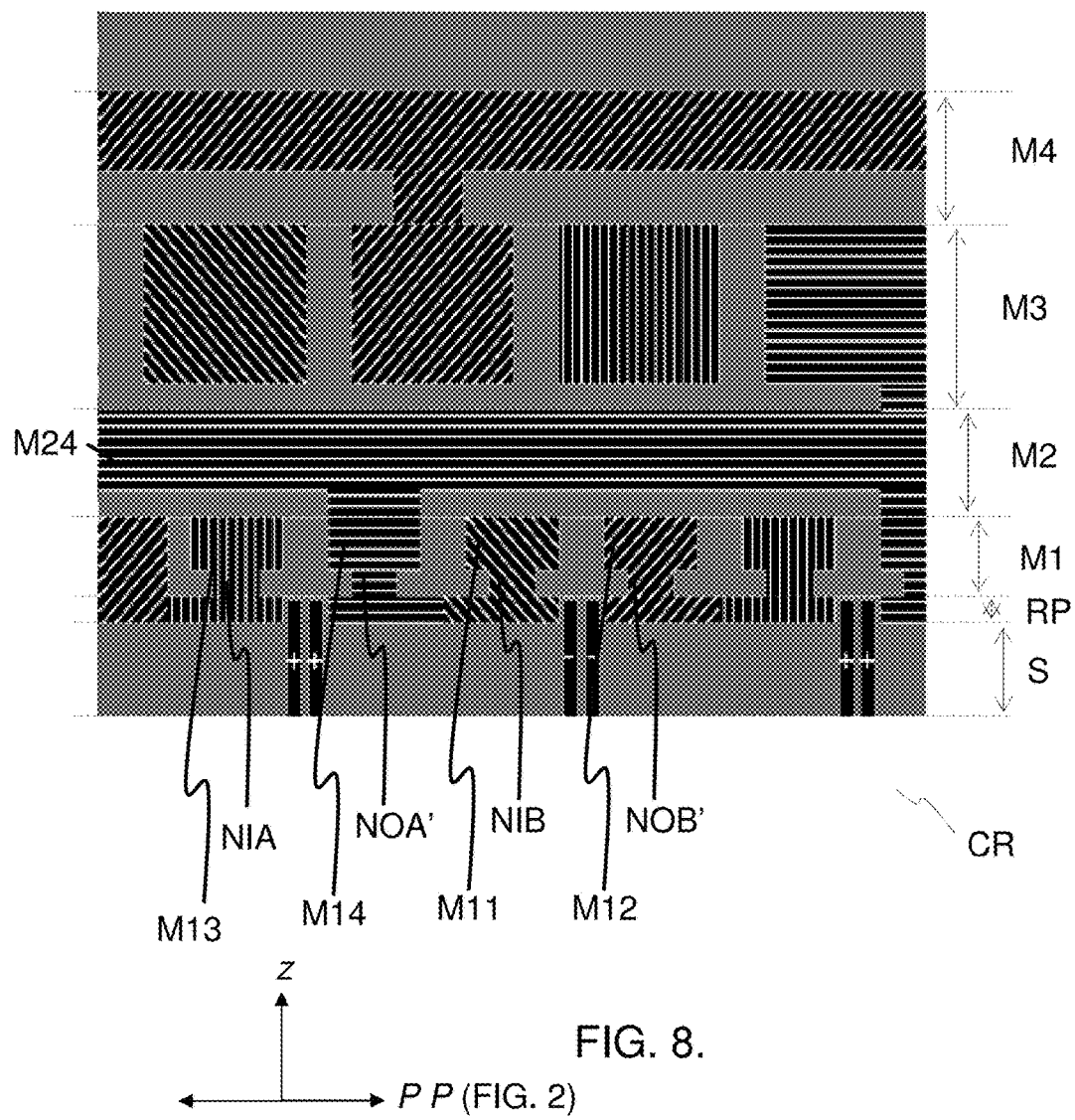
FIG. 8 is a section view (simplified representation) taken along line (plane) PP of FIG. 2.
Figure 9:
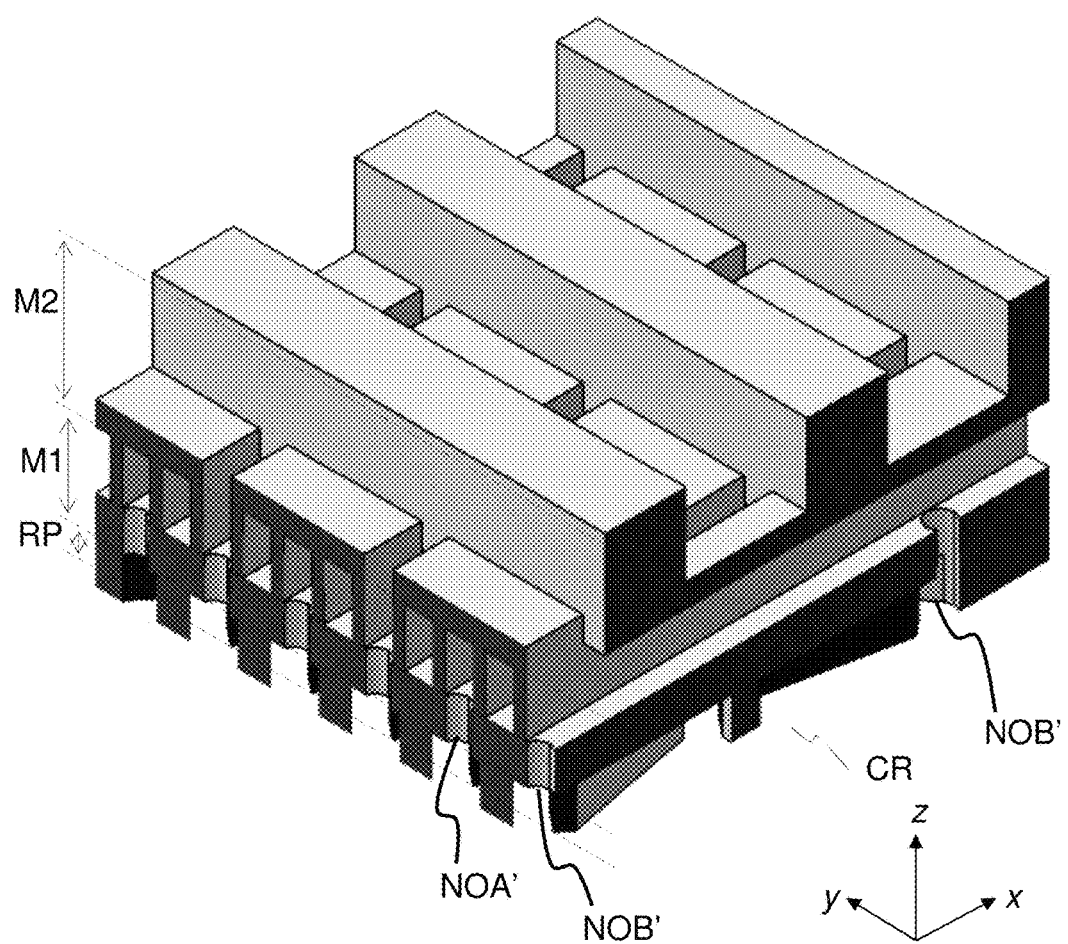
FIG. 9 is a 3D view of a chemical reactor, comprising elements such as depicted in FIGS. 1-8, and according to embodiments.

The 2D views shown in FIGS. 2-7 shall be better understood when compared to the section view of FIG. 8 (taken along plane PP of FIG. 2) and the 3D view of FIG. 9.

Note that a manifold can preferably be formed by two superimposed layers, where a first layer comprises orifices as through holes, and the second layer comprises longitudinal channels oriented perpendicular to the direction of these orifices. This has advantages in terms of manufacturability. Indeed, a lower sub-layer of manifold Mn may comprise orifices meant for fluid communication with a lower level manifold Mn−1 or the reaction layer RP, whereas the upper sub-layer comprises the channels of the manifold Mn. Both the orifices and channels can be machined as through holes in their respective sub-layers, a thing that eases the manufacture process. Two such sub-layers just need to be first superimposed and then assembled, with no substantial additional machining Thus, not only the orifices but also the channels can be machined as through holes, i.e., the channels in this case are grooves which define a continuous void from one surface of a layer to the other surface of the same layer.

In variants, one may also manufacture the orifices and the channels in a single layer, in which case the channels are not continuous through the layer anymore but rather define grooves which are recessed into the layer by a certain depth.

Superimposed layers may further be made of different materials, if necessary, since the different dimensions and shapes of the channel portions vs. orifices may more easily be processed using different materials.

Next, referring more particularly to FIGS. 2 to 4: as per the above specifications, the outlet orifices are necessarily shifted by less than the distance between two contiguous inlet orifices along direction y. Now, they are typically shifted by half of this distance. A half-distance shift corresponds to embodiments depicted in the appended drawings. One understands that this case is probably the simplest to design and manufacture, as this enables a regular arrangement of channels e.g., with identical dimensions in the fluid distribution circuit.

At present, more is said about the chemical cells CC. Referring back to FIGS. 1 and 2, two circuit portions CP that connect, each, a same inlet orifice (e.g., IA) to a same outlet orifice (e.g., OA') are typically separated by a wall E1, E2. Now, in embodiments, the chemical reactor CR is preferably an electrochemical reactor. In that case, the walls E1, E2 are coupled in the reactor as electrodes E1, E2. Note that these electrodes can be bulk electricity conductors, or not. I.e., electrodes may be designed, if necessary, such that electrical power flows along the surface of the electrodes rather than their mass. Additional walls W1, W2 may be suitably arranged to properly separate circuit portion ends, as seen in FIGS. 1, 2.

Note that in electrochemical applications, the electron transfer does not occur between the fluids A, B, but between the electrodes E1, E2 and the fluids A, B. The pairwise contact is needed to close the electronic circuit (the fluids are ionic conductors, thus enabling ion exchange between each other for electroneutrality).

FIGS. 1-10 relate to manifold schemes which allow for uniform periodic distribution of two independent fluid streams and show how electrodes can be easily integrated into this scheme for electrochemical conversion. The depicted manifolds ensure distribution of independent fluid streams and bridging of length scales from macroscopic fluidic connections to microscopic conversion plane. Although the examples shown in FIGS. 1-10 are meant for independent handling of two inlet and two outlet streams; a larger number of streams may be handled similarly, as touched earlier.

Simultaneous electrochemical yield and heat dissipation were modeled for laminar flow conditions in the reaction layer RP (not reported here, this shall be the subject of subsequent publications). This study has shown that embodiments of the invention allow for very high power footprints compared to known microfluidic electrochemical conversion units. For instance, embodiments of the present invention allow for achieving power footprints typically larger than 0.1 or even 1 $W/cm^2$, for average fluid velocities between 0.01 and 1.00 m/s, whereas the prior art devices usually provide power footprints on the order of 0.01 to 0.10 $W/cm^2$.

Several applications can be contemplated for the concepts disclosed herein, notably:
  Electrochemical power delivery for power density (e.g. fuel cells, redox flow batteries);
  Decentralized power generation with integrated storage (e.g. photovoltaics);
  Chemical reactors with defined product composition (e.g. hydrogen reformers, artificial photosynthesis);
  Thermal management with high heat transfer coefficients (e.g. microchannel heat sinks)
  Etc.

Figure 10:
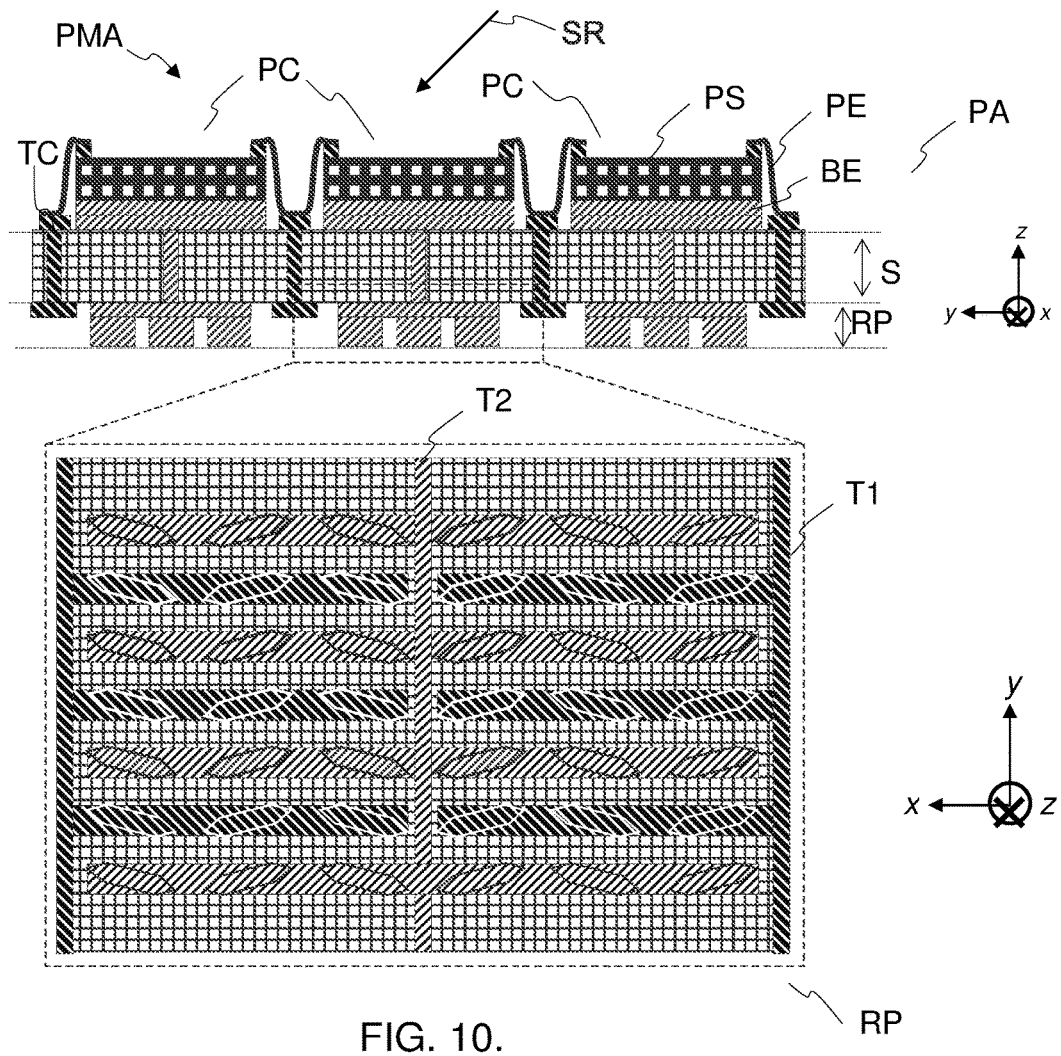
FIG. 10 depicts a photovoltaic apparatus, comprising an array of photovoltaic modules and a chemical reactor, according to embodiments.

The invention can for instance be embodied as a photovoltaic apparatus PA, as illustrated in FIG. 10. The upper part of FIG. 10 corresponds to a section view, while the lower part is a bottom view. Apparatus PA may actually restrict to a single photovoltaic cell, or to a photovoltaic module or, still, it may be a photovoltaic system comprising an array PMA of photovoltaic cells PC (or even modules).

Briefly, photovoltaics generate electrical power by converting solar radiation (i.e., "SR" in FIG. 10) into direct current electricity through semiconductors exhibiting the photovoltaic effect. A photovoltaic cell (or PV cell, also "solar cell" or "photoelectric cell") is a solid state device that converts energy of light directly into electricity by virtue if the photovoltaic effect. A photovoltaic module (also "solar module", "solar panel" or "photovoltaic panel") is an assembly of connected photovoltaic cells. Finally, a photovoltaic system typically includes an array of photovoltaic modules, an inverter and interconnection wiring.

In FIG. 10, the apparatus depicted is a multiple photovoltaic-cell array receiver, which can advantageously be used for concentrated photovoltaics. Concentrated photovoltaic systems (often abbreviated as CPV) use optics (e.g., lenses) to concentrate a large amount of sunlight onto a small area of solar photovoltaic materials to generate electricity (sunlight is converted directly to electricity). Concentration allows for production of smaller areas of solar cells.

Importantly, the patterns shown in FIG. 10 do not correspond to fluidic paths anymore, contrary to FIGS. 1-9. Instead, the stripe patterns now denote typical isopotential areas and a square pattern is now used for the substrate S and some structures in the reaction layer RP.

In all cases, applications of the invention to photovoltaic apparatuses would typically give rise to apparatuses comprising at least one photovoltaic surface PS, electrically connected to a set of photovoltaic electrodes PE, BE (BE stands for back electrode), in addition to a chemical (electrochemical) reactor CR such as described above. The CR is in that case electrically connected to the set of photovoltaic electrodes. Note the vertical ordering of the layers S, RP, etc., which is reversed to that of FIGS. 8 and 9. In FIG. 10, the additional reference TC denotes through contacts. Electronically conductive fins forming the electrodes E1, E2 (in the case of k=2 fluids) within the reaction layer RP' are electrically connected to the through contacts TC. The electrodes E1, E2 (in the case of k=2 fluids) are connected to electrode terminals T1, T2 which in turn are connected to the external load or power source, e.g. the photovoltaic device shown in FIG. 10. The arrangement of T1, T2 shown in FIG. 10 is an example of an interdigitated electrode arrangement which permits to interconnect the electrochemical reactor with the photovoltaic cell consistently over an entire area. This areal dense array of electrode terminals may be particularly useful in embodiments, e.g. for electronic devices employing ball-grid arrays.

When the reactor is used as an electrochemical reactor, then each of the electrodes E1, E2 separates two circuit portions (that connect, each, a same inlet orifice to a same outlet orifice). In other words, each electrode is shared by two chemical cells adjacent along direction y. The corresponding operation method further comprises: dispensing or collecting (step S40 in FIG. 11) electrical charges to or from said electrodes, respectively. There, one understands that a load between the electrodes can be used for electricity generation. Alternatively, electricity can be stored chemically in the fluids.

Figure 12A:
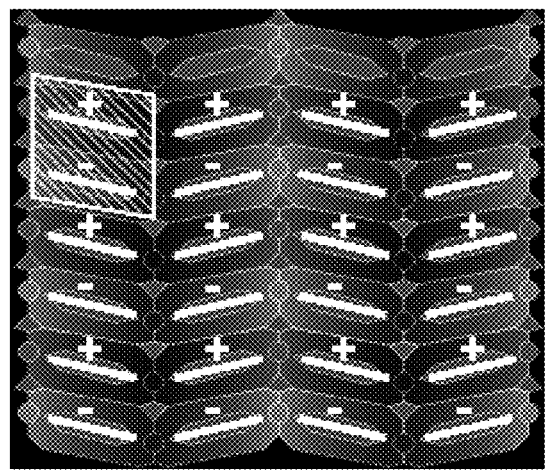
FIGS. 12A-C illustrates three distinct electrode wiring configurations for a reaction layer such as depicted in FIG. 2, and used in an electrochemical reactor, according to embodiments.
Figure 12B:
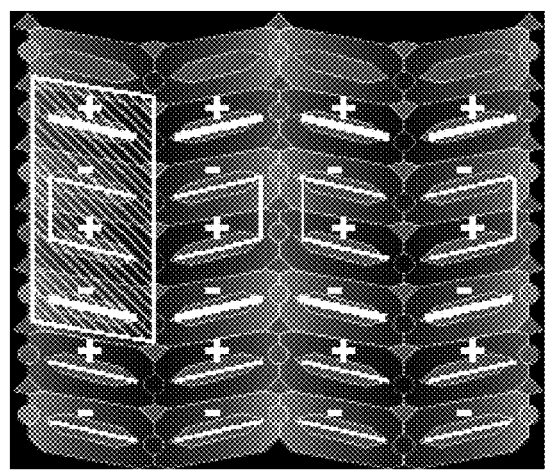
Figure 12C:
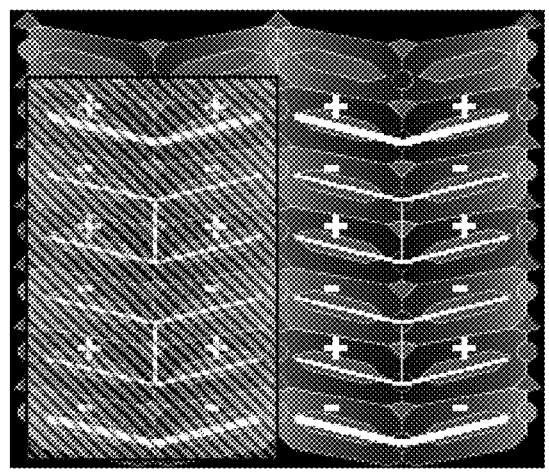

FIGS. 12A-12C denote different examples of arrangement of terminals which will be briefly described below. As known in the fields of fuel cell and battery technology, several single cells can be electrically interconnected to cell strings to form a fuel cell stack or module. When the electrical interconnection between cells is formed in series, the total voltage delivered by this cell string is higher than that of an individual cell. More specifically, the open circuit voltage of a cell string in which the cells are connected in series is equal to the sum of the individual open circuit voltages of each individual cell. One particular form of said series connection of cells is known as a bipolar arrangement in which the electrode of one cell participates in the electrochemical reactions of two contiguous cells. In this case, the polarity assigned to the electrode in one cell is the opposite of the polarity assigned to the electrode in the neighboring cell. In embodiments of this invention, it can be beneficial to operate strings of chemical cells CC such that the open circuit voltages at the terminals connected to an external load or power source are whole number multiples of the open circuit voltage delivered by a single chemical cell CC. By way of example, FIGS. 12A-12C depict different possibilities of connecting individual electrodes E1, E2 to deliver different terminal voltages. For example, if a single chemical cell CC gives rise to an open circuit voltage of 1 V as defined by the electrochemical reactions occurring therein, the terminals (bold lines) in FIG. 12A operate at a voltage of 1 V. Based on the same type of chemical cell CC, the arrangement shown in FIG. 12B delivers a terminal voltage of 3 V. The design in FIG. 12C delivers a terminal voltage of 5 V.

Embodiments have been described, which are scalable to large areas, thanks to an appropriate fluid distribution (manifold) scheme. Some of the disclosed embodiments notably allow high electrochemical power densities through efficient microstructures. The present concepts are highly scalable from small footprints (e.g. microprocessors, few cm$^2$) to large footprints (e.g. large photovoltaic modules, several m$^2$) without loss of power density. They further provide reduced complexity compared to large-scale membrane-based designs since fluid separation by laminar flow is applicable. For completeness, efficient electrochemical energy storage and delivery can be enabled, due to reduced wiring resistance. Also, the embodiments described above allow for storing or delivering electrical power, or at least for chemical reactions to occur, a thing that fundamentally differs from e.g., the conventional microchannel cooler designs that have been proposed in other technical fields.

The above embodiments have been described in reference to the accompanying drawings and may accommodate a number of variants. In preferred embodiments, several combinations of the above features may be contemplated, as illustrated in the drawings. Other variants and detailed examples are given in the next section.

2. Specific Embodiments/Technical Implementation Details

A number of additional variants can be contemplated. For instance, the fluid distribution can be tailored by engineering the hydrodynamic resistance of different fluid paths, e.g. by introducing a specific taper in the manifold channels or varying the orifice diameter which interconnects different manifold layers or the lowest manifold layer with the reaction plane.

Also, concerning electrochemical applications: different electrode wiring configurations can be contemplated, which enable large range of voltage combinations, where the lowest voltage is defined by the potentials of each half-cell reaction (typically ~1 V).

A multitude of supply voltages is beneficial for power supply applications for integrated circuits. A multitude of charging voltages is also beneficial for direct energy storage (electrolysis) from a variety of photovoltaic chips (single- vs. multi-junction, organic, thin-film). The power pins are typically located at the lower face of the reaction layer RP (i.e., a face vis-à-vis the PV systems: with various possible layouts, as illustrated in FIGS. 12A-C.

In addition, for photovoltaic applications such as depicted in FIG. 10, care shall be taken to ensure proximity of the electrodes to power source/sink, in order to minimize wiring losses.

Also, electrode and channel integration schemes can be realized by a variety of techniques, such as:

Conventional microfabrication techniques (e.g. lithography, wet/dry etching, metallization, electroplating);

Bulk machining from carbonaceous material (e.g. by oxygen etching, laser ablation); and Bottom-up fabrication of non-conventional structures (e.g. pyrolyzed structured photoresist, growth of nanotubes or nanowires).

Reliability of the package may also be considered. A solution using silicon as substrate material allows a good thermal coefficient of expansion match between the photovoltaic cells (typically germanium) and the reactor, which reduces stress on the cells. Use of silicon further allows for using MEMS processes to structure the reactor surface and implement sensing elements in the reactor (temperature, radiation, pressure).

Next, minimizing pumping power while maximizing temperature homogeneity across the reactor surface can be both achieved with an efficient manifold such as described above, i.e., a hierarchical fluid distribution/collection system with two main paths (fluid inlet and outlet).

A layer-wise implementation of distribution channels (manifold) and injection orifices/nozzles allows for:

using different materials and fabrication methods to cover the broad range of structure dimensions (e.g., from 20 μm to 20 mm or more); and using different materials in turn allows for achieving low thermo-mechanical stress in the reactor layer, increasing the lifetime of the package.

A complete package (including the reactor and photovoltaic system components) is preferably fabricated using MEMS technology, taking advantage of definition and processing of microstructures, batch processing, bonding techniques, integration of sensing elements, etc.

In reference to FIG. 10, this package typically comprises:

a layer on top, comprising:

photovoltaic cells PC, forming altogether a multichip module, the cells connected by electrical interconnects;

Bypass electrodes (not shown); and

An electrical layer (not shown), to connect the bottom electrodes of the photovoltaic cells.

A lower layer may further contain:

a sensor layer with a network of resistive temperature devices to map the temperature over the entire package right at the bottom of the photovoltaic cell (not shown), if needed; and an insulation layer, to insulate the sensor layer to electrical layer (not shown);

These layers are typically processed using thin film deposition techniques as well as galvanic processes. Solders can be applied by a galvanic process too or any conventional process like screen printing.

In the reactor layer RP, the circuit portions, the walls, etc., can be fabricated using DRIE to enhance heat removal. These channels can be also be fabricated using multiple dicing saws. Orifices can be fabricated by DRIE as well. Die casting and other mass production processes can also be used.

A multichip module package including a reactor as described above may for instance comprise:

High efficiency triple junction solar cells (or "3JPV", commercially available) soldered onto a substrate with a minimal distance between each other;

Electrical interconnects (including conductive pads, connections PE, etc.) which connect a top electrode of one cell to a top electrode of another cell in case of a parallel connection or which connect a top electrode of one cell to a electrically conductive pad which is again connected to the bottom electrode of another cell in case of a serial connection (300 μm wire bond, soldered or welded Cu ribbon or lead frame).

A carrier (not shown) for mechanical support and interface to other systems, and which notably comprises an electrochemical reactor as described earlier, with the manifold layers M1, M2 made of polymer, metal, composite materials, etc.

Finally, it is noted that in a package as described above, the presence of the electrochemical reactor obviates the need for a heat sink.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In that respect, not all the components or steps depicted in the accompanying drawings need be involved, depending on embodiments. In addition, many other variants than explicitly touched above can be contemplated. For example: other materials could be used for fabricating the structures in the reaction layer RP; other patterns of circuit sections CP could be relied upon, such as curved (rounded) circuit portions CP1, CP2, etc.

REFERENCE LIST

CR Chemical Reactor
RP Reaction Layer
E1, E2 Walls (Electrodes)
W1, W2 Additional Walls
x, y Reaction Plane Subtending Directions
UC Unit Cell
UC' Unit Cell (Variant)
CC Chemical Cell(s)
CP Circuit Portions
M1, M2 Fluid Distribution Circuit
IA, IB Inlet Orifices
OA', OB' Outlet Orifices
M1 First Manifold
M11-M14 First Manifold's Parallel Channels
M2 Second (Additional) Manifold
M21-M25 Second (Additional) Manifold's Parallel Channels
PA Photovoltaic Apparatus
PMA Array of Photovoltaic Modules
PM Photovoltaic Modules
PS Photovoltaic Surface PE, BE Photovoltaic Electrodes
A Fluid A
B Fluid B
T1 Electrical connection terminal 1
T2 Electrical connection terminal 2 (opposite polarity of T1)

The invention claimed is:

1. A photovoltaic apparatus comprising an array of photovoltaic cells, the photovoltaic apparatus comprising:
   at least one photovoltaic surface electrically connected to a set of photovoltaic electrodes; and
   a chemical reactor electrically connected to the set of photovoltaic electrodes, said chemical reactor designed for enabling N pairwise fluid contacts among k chemical fluids, with $k \geq 2$ and $N \geq 4$, the chemical reactor comprising:
   a reaction layer extending in a 2D plane subtended by two directions (x, y), in a perpendicular fashion, the reactor layer comprising: N chemical cells, each including a plurality of circuit portions, two circuit portions of the plurality of circuit portions being designed for enabling circulation of two of the k chemical fluids, respectively, said two circuit portions further intersecting each other, thereby enabling one of the N pairwise fluid contacts for said two of the k chemical fluids;
   a fluid distribution circuit comprising k sets of inlet orifices and k sets of outlet orifices, wherein inlet orifices in one set of the k sets of inlet orifices and another inlet orifices in another set of the k sets of inlet orifices are arranged in an alternate manner along lines parallel to one of the two directions (x, y), each of the k sets of inlet orifices dispensing a corresponding one of the k chemical fluids to the reaction layer; and wherein outlet orifices in one set of the k sets of outlet orifices and another outlet orifices in another set of the k sets of outlet orifices are arranged in an alternate manner along another lines parallel to the one of the two directions, each of the k sets of outlet orifices collecting a corresponding one of the k chemical fluids from the reaction layer, the k sets of outlet orifices arranged to be shifted by a predetermined distance along said one (y) of the two directions with respect to the inlet orifices, and wherein,
   each of the plurality of circuit portions connects, via respective ends thereof, an inlet orifice of the k sets of inlet orifices to an outlet orifice of the k sets of outlet orifices.

2. The photovoltaic apparatus according to claim 1, wherein each of the k sets of inlet orifices and the k sets of outlet orifices of the chemical reactor joins ends of four circuit portions of the plurality of circuit portions belonging to distinct chemical cells of the N chemical cells, said distinct chemical cells contiguous in the reaction plane.

3. The photovoltaic apparatus according to claim 1, wherein the reaction layer and the fluid distribution circuit of the chemical reactor form a 2D periodic array, a unit cell of said array periodically repeating in said 2D plane by translation along one or each of said two directions (x, y).

4. The photovoltaic apparatus according to claim 3, wherein:
   $k=2$;
   each of the k sets of inlet orifices and the k sets of outlet orifices joins ends of four circuit portions of the plurality of circuit portions belonging to distinct chemical cells of the N chemical cells, said distinct chemical cells contiguous in the reaction plane; and
   the unit cell comprises
      four chemical cells of the N chemical cells;
      eight circuit portions of the plurality of circuit portions;
      two inlet orifices of the k sets of inlet orifices; and
      two outlet orifices of the k sets of outlet orifices.

5. The photovoltaic apparatus according to claim 1, wherein the fluid distribution circuit of said chemical reactor comprises at least a first manifold, the first manifold comprising several parallel channels, each perpendicular to said one (y) of the two directions (x, y) and in fluid communication with orifices of one of the k sets of inlet orifices or one of the k sets of outlet orifices.

6. The photovoltaic apparatus according to claim 5, wherein the fluid distribution circuit of the chemical reactor further comprises a second manifold, the second manifold comprising several parallel channels that are, each, rotated with respect to, perpendicular to, and in fluid communication with the parallel channels of the first manifold.

7. The photovoltaic apparatus according to claim 5, wherein one of the first manifold and the second manifold is formed by two superimposed layers, a first one of said two superimposed layers comprising orifices as through holes, a second one of said two superimposed layers comprising channels as through holes.

8. The photovoltaic apparatus according to claim 1, wherein the k sets of outlet orifices of said chemical reactor are shifted by half of a distance between two contiguous inlet orifices of the k sets of inlet orifices along said one of the two directions.

9. The photovoltaic apparatus according to claim 1, wherein the reactor is an electrochemical reactor, and wherein another two circuit portions of the plurality of circuit portions that connect, each, a same inlet orifice of the k sets of inlet orifices to a same outlet orifice of the k sets of outlet orifices are separated by a wall coupled in the reactor as electrodes, such that two chemical cells of the N chemical cells adjacent along said one of the two directions share said electrode.

10. The photovoltaic apparatus according to claim 9, further comprising:
    a series connection of two or more photovoltaic cells of said array of photovoltaic cells, a through contact structure disposed between two adjacent photovoltaic cells of the array of photovoltaic cells and connecting to a photovoltaic electrode of the set of photovoltaic electrodes on the adjacent cells.

11. The photovoltaic apparatus according to claim 10, further comprising:
    electronically conductive fins forming the electrodes within the reaction layer, said fins being electrically connected to the through contact structures.

12. The photovoltaic apparatus according to claim 11, wherein said electrodes within the reaction layer are connected to respective electrode terminals which are connected to an external power source.

13. The photovoltaic apparatus according to claim 11, wherein said electrode terminals define an interdigitated electrode arrangement to interconnect the reactor with a photovoltaic cell of the two or more photovoltaic cells of said array.

14. The photovoltaic apparatus according to claim 13, wherein an arrangement of the electrodes within the reaction layer is a bipolar arrangement wherein an electrode of one photovoltaic cell participates in an electrochemical reaction of two contiguous chemical cells of the N chemical cells and a polarity assigned to an electrode in one photovoltaic cell is the opposite polarity assigned to the electrode in its neighboring photovoltaic cell.

15. The photovoltaic apparatus according to claim 13, wherein an arrangement of electrodes within the reaction layer provides an interconnection of chemical cells of the N chemical cells in series to deliver a terminal voltage.

16. A chemical reactor, designed for enabling N pairwise fluid contacts among k chemical fluids, with k≥2 and N≥4, the reactor comprising:
- a reaction layer extending in a 2D plane subtended by two directions (x, y), perpendicular to each other, the reactor layer comprising: N chemical cells, each including a plurality of circuit portions, two circuit portions of said plurality of circuit portions being designed for enabling circulation of two of the k chemical fluids, respectively, said two circuit portions of said plurality of circuit portions further intersecting each other, thereby enabling one of the N pairwise fluid contacts for said two of the k chemical fluids;
- a fluid distribution circuit comprising k sets of inlet orifices and k sets of outlet orifices,
- wherein inlet orifices in one set of the k sets of inlet orifices and another inlet orifices in another set of the k sets of inlet orifices are arranged in an alternate manner along lines parallel to one of the two directions (x, y), each of the k sets of inlet orifices dispensing a corresponding one of the k chemical fluids to the reaction layer; and
- wherein outlet orifices in one set of the k sets of outlet orifices and another outlet orifices in another set of the k sets of outlet orifices are arranged in an alternate manner along another lines parallel to the one of the two directions, each of the k sets of outlet orifices collecting a corresponding one of the k chemical fluids from the reaction layer, the k sets of outlet orifices arranged to be shifted by a predetermined distance along said one of the two directions with respect to each of the k sets of inlet orifices, and wherein,
- each of the plurality of circuit portions connects, via respective ends thereof, an inlet orifice of the k sets of inlet orifices to an outlet orifice of the k sets of outlet orifices; and
- wherein a corresponding one of the k chemical fluids are dispensed to the reaction layer, k≥2, via each of the k sets of inlet orifices, such that, in each of the N chemical cells, two of the k chemical fluids circulate in said two circuit portions of said plurality of circuit portions, make contact and thereby enable a chemical reaction, the k sets of outlet orifices collecting k chemical fluids from the reaction layer, and wherein
- electrical charges are dispensed to electrodes or collected from electrodes, respectively, wherein each of said electrodes separates two circuit portions that connect, each, a same inlet orifice of the k sets of inlet orifices to a same outlet orifice of the k sets of outlet orifices, whereby each of said electrodes is shared by two chemical cells of the N chemical cells adjacent along said one of the two directions.

* * * * *